Dec. 5, 1933.  J. A. MACDONALD  1,938,296
GAS PRODUCER
Filed June 30, 1930  2 Sheets-Sheet 1

INVENTOR
J.A. MACDONALD
BY
ATTORNEY

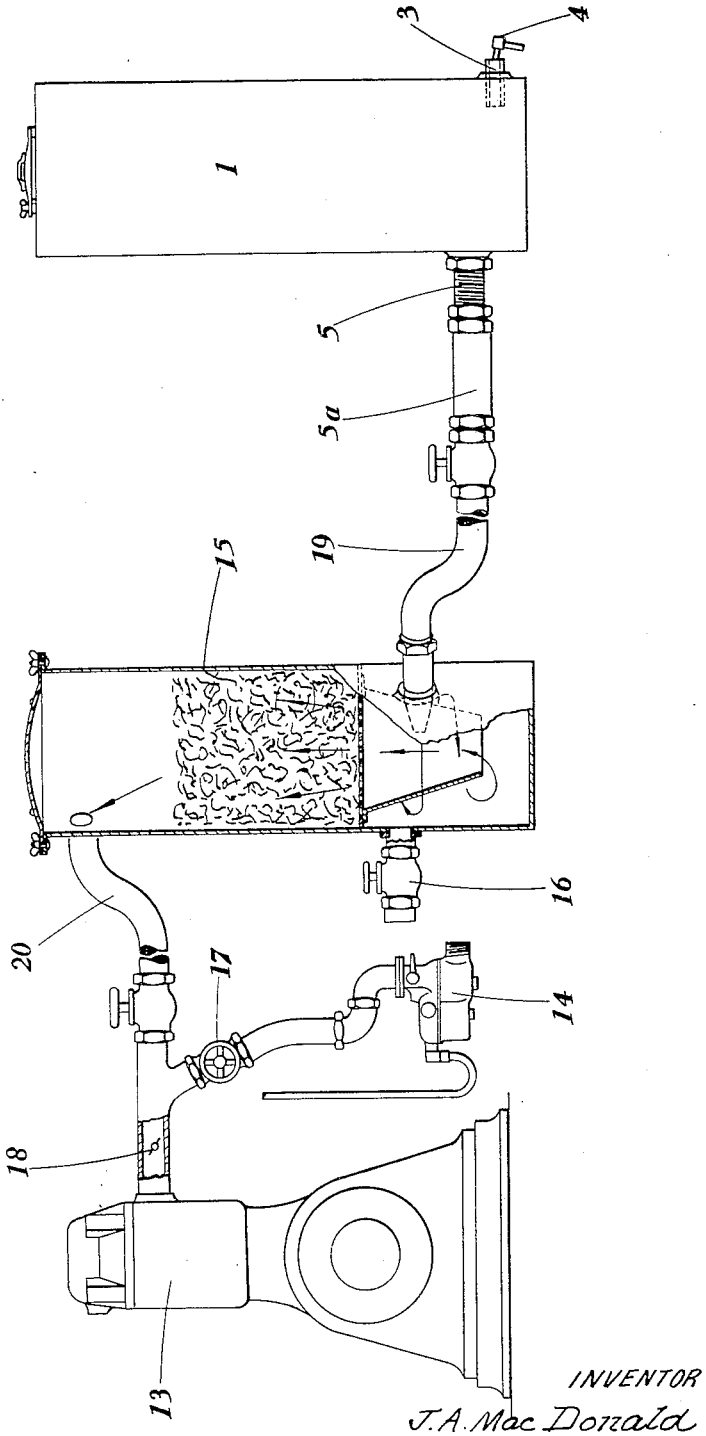

Patented Dec. 5, 1933

1,938,296

UNITED STATES PATENT OFFICE 1,938,296

GAS PRODUCER

James Alexander Macdonald, Nakuru, East Africa

Application June 30, 1930, Serial No. 465,018, and in Great Britain July 29, 1929

7 Claims. (Cl. 48—76)

This invention relates to the production of combustible gases (which will hereinafter be referred to as producer gas) by reacting on fuels with air and water vapour under heat, and has for its object to provide an improved form of apparatus therefor which will be light in weight, simple to construct and operate and cheap to manufacture.

In use, the producer gas may be cooled and dehydrated, as well as cleaned, by any of the usual suitable means, but it is a further object of the invention to provide an apparatus which will deliver a producer gas of good quality together with water in a state adapted to be fed directly to an engine without previous dehydration.

The invention primarily comprises a producer gas plant having a gasification chamber of substantial volume, a pan-like bottom adapted to hold water, an air inlet pipe of restricted diameter extending within said chamber and adapted to create an incandescent zone of limited volume and high temperature at or adjacent the delivery end thereof, and means to deliver a supply of water on to said incandescent zone.

In the preferred form, the inlet and outlet pipes are arranged horizontally and (especially in the case of the inlet pipe) as close as practicable to the base of the chamber. In operating the plant, water is supplied in excess of the amount required for the gasification reaction so that the base of the chamber is kept wet or even flooded, it being usually impossible (within reasonable limits) to supply too much water, any excess from the base of the chamber escaping through the air inlet pipe.

One effect of this arrangement appears to be that a substantial volume of water vapour is created and maintained within the body of the chamber, the localized incandescent zone being surrounded by an atmosphere of said vapour and the primary products of the reaction being immediately cooled by it and "fixed" and delivered in their original state without the occurrence of serious secondary reactions. Further, the walls of the chamber are maintained much cooler than is usual in such plants even after prolonged use.

The producer gas is normally delivered with an amount of water vapour (either in a free state or not) which considerably exceeds normal practice, but at a temperature which is usually lower than 100° C. If dried, it discloses on analysis a producer gas of good quality; but it is also readily capable of direct use without drying.

The invention is applicable for use with solid fuel such as coal or charcoal, or with liquid fuels. In the former case, the height of the inlet pipe above the bottom must be sufficient to provide for the accumulation of a certain amount of ash.

The outlet pipe is preferably situated opposite and slightly above the inlet pipe, and its penetration within the chamber is preferably adjustable to provide means for controlling the reaction.

The apparatus as described may be coupled directly to an internal combustion engine with the interposition of nothing more than any simple device for extracting particles of solid carbon, and when a steady working condition has been reached, the control of the plant is effected by varying the amount of water supply for the inlet pipe and the penetration of the outlet pipe within the chamber.

The invention is illustrated in the accompanying drawings in which:

Figure 3 is a view in elevation, partly in section, showing the plant coupled to a cleaner or scraper and to an internal combustion engine.

Figure 1:
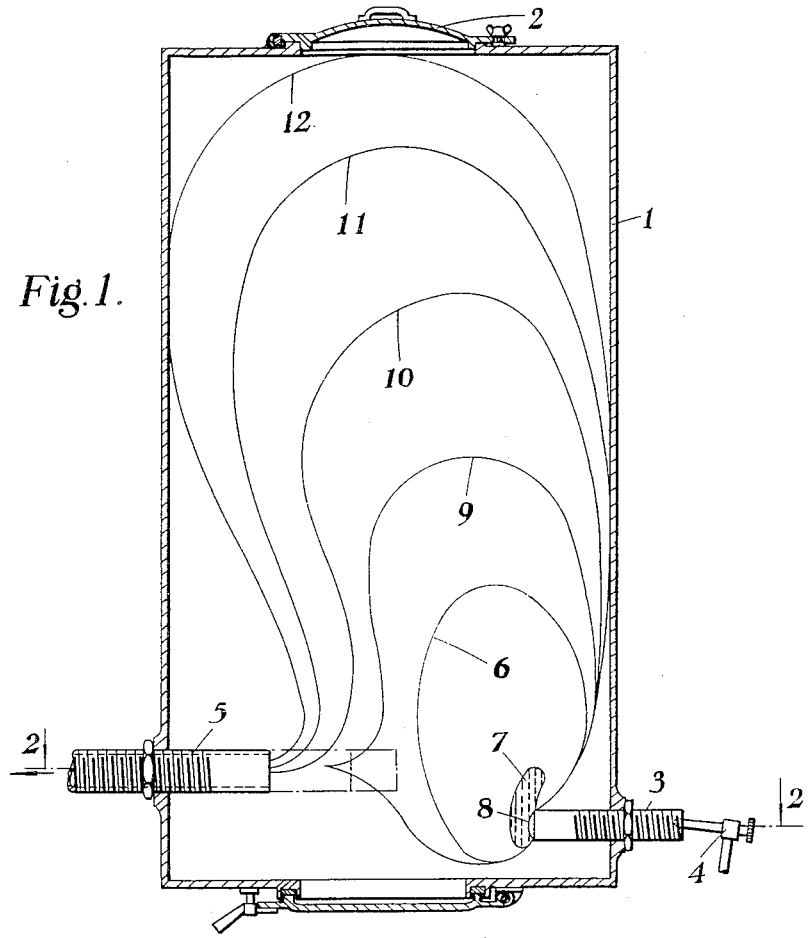
Figures 1 and 2 show in vertical and horizontal cross section diagrammatic representations of a plant in accordance with the invention intended for use with charcoal, Fig. 2 being taken on the line 2—2 of Fig. 1.
Figure 2:
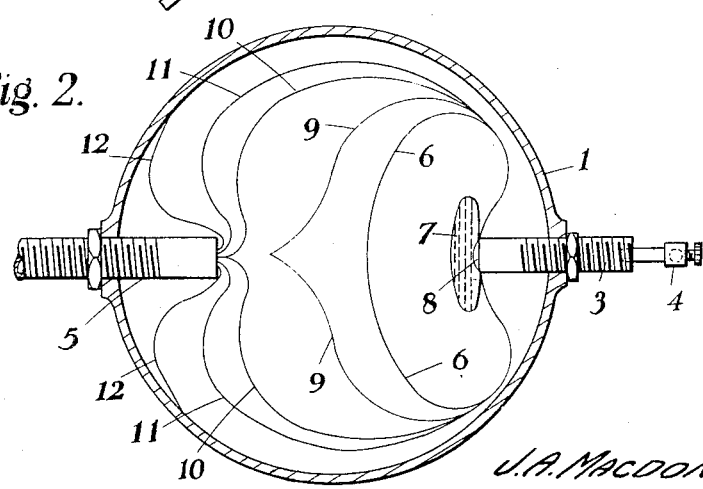

In the form illustrated, the plant comprises a cylindrical preferably metallic chamber 1 having an upper closure 2a for the insertion of fuel e. g. coke. The air inlet pipe 3 penetrates adjustably within the chamber as shown, and a spray 4 is arranged to direct a finely-divided jet of water through the inlet pipe on to the incandescent zone as high up as possible, the term "incandescent zone" referring to the central hot spot of the gasification region.

The outlet pipe 5 for the reaction products is adjustably mounted in the opposite wall of the chamber coaxially with the pipe 3. Its penetration within the chamber may be extended to the points indicated in dotted lines. It is arranged slightly higher than the inlet to avoid its being flooded.

The inlet pipe 3 for air and water is arranged as low as convenient for the accumulation of ash, and to provide an overflow for any water collecting in the bottom of the chamber, it being particularly important to keep this pipe low.

In operating such a plant, fuel e. g. coke is laid to surround the inner end of the inlet pipe and may be filled up to the top closure 2a. The fire is then lit, e. g. by inserting a torch through the pipe 3, air in sufficient quantity is thereby aspirated through inlet pipe 3, and when combustion is satisfactorily established, water, at first in small quantities, is injected through the spray 4. Circulation is effected by applying pressure to the pipe 3 or, preferably suction to the pipe 5 which may be that of an internal combustion engine 13 pistons, the engine being driven from petrol until a steady condition has been reached in the producer, whereupon the petrol supply to the carburettor 14 is shut off and the engine driven solely on the product of the plant and the air reaching it through the carburettor air inlet and mixing with the gas. The air for the engine may alternatively be supplied through a cleaner or scraper 15 by opening an air cock 16 and shutting off the carburettor altogether by means of the cock 17. In this case, the air mixes with the producer gas reaching the scraper through pipe 5 and the mixture takes place in the scraper. The engine can be controlled by the throttle 18. In all cases, provision should be made for varying the penetration of the outlet pipe 5 without causing an air lock, as diagrammatically indicated at 5A.

From an examination of the temperature of the walls of the chamber 1 during warming up and running, it would appear that when a steady condition has been reached the flame is confined to an inner space which may correspond probably to that indicated at 6, the hottest part of the flame where combustion of the fuel principally takes place being indicated at 7, and 8 indicating the inner zone where no combustion takes place.

The water particles penetrating the incandescent zone 7 appear to be converted to vapour which moves upwardly and outwardly in high velocity streams in expanding radial currents of hot vapour, and the zones of equal temperature under steady conditions appear to correspond generally with the isothermals shown at 9, 10, 11, 12. A body or current of relatively coal water vapour spreads between the edge of the flame 6, and the right-hand wall of the chamber in Figure 1, so that even at the lowest part of the chamber the temperature of the wall does not exceed a value which can be withstood by metal, and it is not necessary to use fire-brick or any special lagging. The temperature at the central part of the top underneath the closure 2 remains hotter than the temperature in other parts of the roof, and the temperature of the left-hand wall in Figure 1 is hottest about one-third or one-quarter way down, the temperature immediately above the outlet pipe 5 remaining substantially cool.

Under the suction of the internal combustion engine, the air is supplied to inlet pipe 3 at atmospheric pressure, the end of the pipe being merely left open. The supply of water, however, is controlled so that excess is always present, the bottom of the container being wet or even flooded.

As a rule the amount of water supplied after the bottom has been flooded is 1 kg. or 1½ kg. per 1 kg. of charcoal. An actual plant which has given satisfactory results comprises a drum 90 c. m. high and 52 c. m. diameter with inlet and outlet pipes of 2.5 to 5 c. m. This plant will drive a four cylinder automobile engine rated at 10–20 H. P. at 1100 revolutions per minute, the engine being altered only to provide a compression ratio of about 6 to 1.

In a modification, the plant comprises a cylindrical chamber 180 c. m. high and 67 c. m. diameter, the inlet and outlet pipes being 5 c. m. or 7 c. m. diameter. When this plant was coupled to a four-cylinder 75 H. P. engine at 550 revolutions, the consumption was in the region of 32 kg. of water per hour. The amount of water supplied when coupled direct to a single cylinder engine designed to give 8 H. P. at 350 revolutions per minute was about 5 kg. per hour, the only adjustment required other than the setting of the spray valve being a variation of the penetration of the outlet pipe 5 which advantageously should be given a different setting for engines differing in output by 10 H. P. or more. With this plant the inlet pipe is about 7 c. m. above the bottom of the chamber.

In all cases, the flooding of the chamber floor in conjunction with a low inlet pipe are important for best results.

By controlling the water supply and the penetration of the outlet pipe 5 within the chamber, a very delicate control of the operation of the plant is provided; when the plant is, for example, coupled to an internal combustion engine, comparatively slight axial displacement of the outlet pipe 5 produces appreciable variation in the power output, so that an optimum position is readily found for the outlet pipe. After this position is reached, the engine may be controlled in the ordinary way by the throttle 18 controlling the supply of the gas products, the air being inspirated in the cylinders as described above. Preferably, the pipe line 19, 20 between the outlet pipe 5 and the engine is made as short as possible.

If a plant designed for an engine of given horse-power is utilized with an engine of larger horse-power, the suction in pipe 5 will be increased, and the plant generally will work at higher temperatures. Within reasonable limits, it will, however, respond to the increased power output on increase of the amount of water supply through the nozzle 4, and resetting of the outlet pipe 5, and of course more frequent feeding of fuel through the closure 2.

The invention is not confined to the use of solid fuel, as it may be employed with liquid fuels, which may be burnt in a similar kind of closed chamber, the liquid fuel being separately injected or applied through the air inlet.

The plant as described above can be operated successfully with oil fuel either by direct injection or by mounting a drip feed device in the upper wall of the inlet pipe 3. The combustion zone in such case is localized by providing a mass of solid material such as fire brick chippings adjacent the end of the inlet pipe.

The said plants can also be operated successfully with soft coal or anthracite in the form of nuts, although in such case a tar-extractor may be required.

In all cases it is important to have a chamber of sufficient volume that the incandescent zone is localized and is entirely enveloped in an atmosphere of water vapour, and that an extended path is provided for the circulation of the vapour and products of combustion which probably move in zones corresponding in direction to the general direction of the isothermals indicated, the water vapour serving not only to lower generally the temperature of the outlet gases but also preventing the production of secondary reactions in zones substantially remote from that of the flame 6.

It is very important that all joints of the fuel and ash closures be tightly sealed, and all air leaks into the chamber be avoided, the chamber being completely closed except for the inlet and outlet pipes 3, 5.

With the arrangement described, the incandescent zone remains limited in volume and does not tend to creep up the chamber on prolonged use, probably owing to the movement of the water vapour from the upper part of the chamber towards the outlet pipe. If, however, either the outlet pipe or inlet pipe is located substantially higher up the wall of the chamber, the incandescent zone tends to grow larger throughout the firing of a charge, and the simple self-governing form of operation which has been described would require some additional form of control or correction.

Although the localized incandescent zone may be at 1300° C. or more, it is an advantage of the invention that the temperature round the walls of the container is maintained low so that a metal container of ordinary quality may be employed. In certain cases where a plant of given capacity is being run under an overload, provision of a separate water supply chamber may be a convenient means of adding to the vapour content, since under the overload conditions the gases in the outlet will otherwise be delivered at a temperature substantially higher than that designed for. The water may be fed through a nozzle arranged above the inlet pipe, so as to deliver the jet on the top of the incandescent zone.

I claim:

1. A producer gas plant comprising a chamber of substantial volume having a bottom capable of holding water, an inlet pipe for air leading into said chamber, an offtake leading from the chamber at a relatively higher point than the inlet, and means for delivering a water spray through the inlet.

2. A producer gas plant comprising a chamber of substantial volume having a bottom capable of holding water, an inlet pipe for air leading into said chamber, an offtake leading from the chamber at a relatively higher point than the inlet, and means for delivering a water spray through the inlet, the water delivered being in excess of reaction requirements.

3. A producer gas plant comprising a chamber of substantial volume having a bottom capable of holding water, an inlet pipe for air leading to the interior of the chamber, an outlet pipe leading from the chamber at a point above the inlet pipe, the inlet and outlet pipes being relatively adjustable for heat zone control, and means to direct a jet of water onto the space adjacent the inlet end of said inlet pipe.

4. A producer gas plant comprising a chamber of substantial volume having a bottom capable of holding water, an inlet pipe for air leading to the interior of the chamber, an outlet pipe leading from the chamber at a point above the inlet pipe, the inlet and outlet pipes being relatively adjustable for heat zone control, and means to direct a jet of water onto the space adjacent the inlet end of said inlet pipe, said means serving to deliver water in excess of reaction requirements.

5. A producer gas plant comprising a chamber of substantial volume having a pan-like bottom, an inlet pipe leading into the chamber for the admission of air, an outlet pipe leading from the chamber at a point above the inlet pipe, and means to direct the volume of water through the inlet pipe in excess of reaction requirements, the excess water accumulating in the pan-like bottom.

6. A producer gas plant comprising a chamber of substantial volume having a bottom capable of holding water, an inlet pipe for air penetrating within and opening into said chamber, an offtake leading from the chamber at a relatively higher point than the inlet, and means for delivering a water spray through the inlet.

7. A producer gas plant comprising a chamber of substantial volume having a bottom capable of holding water, an inlet pipe for air leading into said chamber, said inlet pipe being mounted for adjustment relative to the chamber to determine the extent of penetration of the pipe within the chamber, an offtake leading from the chamber at a relatively higher point than the inlet, and means for delivering a water spray through the inlet.

JAMES ALEXANDER MACDONALD.